US011857106B2

(12) United States Patent
Savioz

(10) Patent No.: US 11,857,106 B2
(45) Date of Patent: Jan. 2, 2024

(54) INLINE FLUID FOAMING DEVICE

(71) Applicant: SOCIETE DES PRODUITS NESTLE S.A., Vevey (CH)

(72) Inventor: Gregory Savioz, Saxonne (CH)

(73) Assignee: Societe des Produits Nestle S.A., Vevey (CH)

( * ) Notice: Subject to any disclaimer, the term of this patent is extended or adjusted under 35 U.S.C. 154(b) by 940 days.

(21) Appl. No.: 16/641,309

(22) PCT Filed: Aug. 14, 2018

(86) PCT No.: PCT/EP2018/072051
§ 371 (c)(1),
(2) Date: Feb. 24, 2020

(87) PCT Pub. No.: WO2019/038143
PCT Pub. Date: Feb. 28, 2019

(65) Prior Publication Data
US 2021/0076870 A1 Mar. 18, 2021

(30) Foreign Application Priority Data
Aug. 25, 2017 (EP) .................................... 17187887

(51) Int. Cl.
*A47J 31/44* (2006.01)
*A47J 31/46* (2006.01)
*A47J 31/52* (2006.01)

(52) U.S. Cl.
CPC ......... *A47J 31/4485* (2013.01); *A47J 31/461* (2018.08); *A47J 31/468* (2018.08); *A47J 31/52* (2013.01)

(58) Field of Classification Search
CPC ...... A47J 31/4485; A47J 31/468; A47J 31/52; A47J 31/60; A47J 31/542; A47J 31/461;
(Continued)

(56) References Cited

U.S. PATENT DOCUMENTS 3,730,488 A * 5/1973 Gardner, Jr. ......... H02K 49/102
310/104
6,170,386 B1 * 1/2001 Paul .................... A47J 36/2433
99/275

(Continued)

FOREIGN PATENT DOCUMENTS

WO 2014096183 6/2014
WO 2017029267 2/2017
(Continued)

*Primary Examiner* — Phuong T Nguyen
(74) *Attorney, Agent, or Firm* — K&L Gates LLP

(57) ABSTRACT

Inline fluid foaming device (10) for providing a foamed fluid directly into a container, the device (10) comprising an air path (120) for introducing a certain quantity of air into the device (10), and a fluid path (130) for introducing fluid into the device (10) coming from a fluid container (16), the mixture of air and fluid passing to a centrifugal pumping and foaming element (11) such that the amount of fluid into the device (10) is pumped by the centrifugal movement of the pumping and foaming element (11) and the foaming of the mixture is provided by driving it under a certain level of shear stress in the element (11), the device (10) further comprising a heating unit (14) to where the foamed mixture of fluid and air is conveyed for its optional later heating. The invention further relates to a beverage system comprising such an inline fluid foaming device (10) and a beverage dispensing machine.

15 Claims, 17 Drawing Sheets

(58) Field of Classification Search
CPC .. A47J 31/4453; A47J 31/4496; A47J 43/127; A47J 31/46
USPC .................. 99/275, 280, 281, 288, 290, 295
See application file for complete search history.

(56) References Cited

U.S. PATENT DOCUMENTS

2002/0104854 A1*  8/2002  Jensen ................. B67D 3/0003
                                                       222/481.5
2010/0198643 A1*  8/2010  Friedman ................ G07F 9/002
                                                       700/285
2016/0000257 A1*  1/2016  Ait Bouziad ....... A47J 31/4485
                                                       99/452

FOREIGN PATENT DOCUMENTS

WO          2017076997         5/2017
WO          2017097674         6/2017
WO          2017216015         12/2017

* cited by examiner

Recipe A:

| Sequence 1 | |
|---|---|
| Type | (Foam, Milk, Cofee) |
| Motor speed [rpm] | (0 – 5000) |
| Motor time [s] | (0 – X) |
| Temperature [°C] | (0 – 80) |
| Air valve duty cycle [%] | (0 – 100) |
| Coffee type | (None, Ristretto, Expresso, Lungo) |

| Sequence 2 | |
|---|---|
| Type | (Foam, Milk, Cofee) |
| Motor speed [rpm] | (0 – 5000) |
| Motor time [s] | (0 – X) |
| Temperature [°C] | (0 – 80) |
| Air valve duty cycle [%] | (0 – 100) |
| Coffee type | (None, Ristretto, Expresso, Lungo) |

⋮

| Sequence N | |
|---|---|
| Type | (Foam, Milk, Cofee) |
| Motor speed [rpm] | (0 – 5000) |
| Motor time [s] | (0 – X) |
| Temperature [°C] | (0 – 80) |
| Air valve duty cycle [%] | (0 – 100) |
| Coffee type | (None, Ristretto, Expresso, Lungo) |

Standalone recipes (milk only)
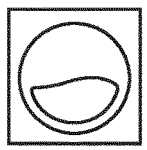 Liquid
| Type | Milk |
|---|---|
| Motor speed [rpm] | 3000 |
| Motor time [s] | 60 |
| Temperature [°C] | 70 |
| Air valve duty cycle [%] | 100 |
| Coffee type | None |
 Light foam
| Type | Milk |
|---|---|
| Motor speed [rpm] | 4000 |
| Motor time [s] | 60 |
| Temperature [°C] | 70 |
| Air valve duty cycle [%] | 10 |
| Coffee type | None |
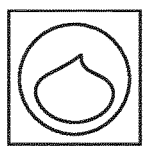 Dense foam
| Type | Milk |
|---|---|
| Motor speed [rpm] | 4500 |
| Motor time [s] | 60 |
| Temperature [°C] | 70 |
| Air valve duty cycle [%] | 0 |
| Coffee type | None |
FIG. 12

Coffee recipes (accessory + coffee machine)
Latte
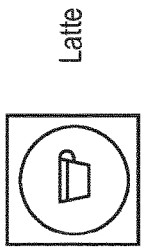
| Type | Foam | Type | Milk |
|---|---|---|---|
| ... | ... | ... | ... |
| Time [s] | 5 | Time [s] | 25 |
| Coffee type | None | Coffee type | Expresso* |
Cappuccino
| Type | Foam | Type | Coffee |
|---|---|---|---|
| ... | ... | ... | ... |
| Time [s] | 20 | Time [s] | - |
| Coffee type | None | Coffee type | Expresso* |
Latte Macchiato
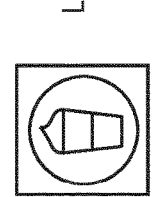
| Type | Foam | Type | Milk | Type | Coffee |
|---|---|---|---|---|---|
| ... | ... | ... | ... | ... | ... |
| Time [s] | 20 | Time [s] | 20 | Time [s] | - |
| Coffee type | None | Coffee type | None | Coffee type | Lungo* |
FIG. 13

INLINE FLUID FOAMING DEVICE

CROSS REFERENCE TO RELATED APPLICATIONS

The present application is a National Stage of International Application No. PCT/EP2018/072051, filed on Aug. 14, 2018, which claims priority to European Patent Application No. 17187887.9, filed on Aug. 25, 2017, the entire contents of which are being incorporated herein by reference.

FIELD OF THE INVENTION

The present invention is directed to an inline fluid foaming device, more particularly to an inline fluid pumping and foaming device, which can optionally also heat the fluid delivered. The inline fluid foaming device of the invention can operate in standalone mode or connected to a beverage dispensing machine.

BACKGROUND OF THE INVENTION

Foams consist of two phases, an aqueous phase and a gaseous (air) phase. A fluid foam is therefore a substance which is formed by trapping many gas bubbles in a fluid structure: producing a fluid foam involves not only the generation of these gas bubbles, but also the packing and the retention of these bubbles into the overall fluid structure in order to provide a stable foam.

It is desirable to produce food foams obtained from food fluid products with the tiny and stable air bubbles to provide a light texture and different mouth feel. In most of the food foams, proteins are the main surface active agents helping in the formation and stabilization of the dispersed gaseous phase, creating protein-stabilized foams. Proteins will always have certain stresses to overcome, such as mechanical and gravitational: the capacity of proteins to stabilize the foaming structure formed against these stresses will determine foam stability, usually expressed as the time required for 50% of the fluid to drain from the foam, i.e., the time required for reaching a 50% reduction in the foam volume.

When foaming a fluid, it would be desirable to produce foam on demand, having a superior quality. Moreover, it would be desirable to provide this prime quality foam as quickly as possible and in a repeatable way, meaning that the foam quality is controlled and can be repeated from one fluid to another.

One of the most commonly used food fluid foams is milk foam. Devices for producing milk foam are well known in the state of the art: typically, these devices comprise a reservoir, into which milk is filled, the reservoir being also provided with a rotating part, typically a whisk arranged in its lower surface, causing the foaming of the milk by agitating the milk which in turn traps air inside the liquid film. The production of milk foam in these known devices requires however time, quite a number of manipulations and also requires cleaning every time foam is produced. Also, in order to regulate the characteristics of the foam obtained, the geometry of the whisk needs to be controlled, something which is hard to understand and control in a precise way, making any repeatability of the process too complex and not achievable.

Document EP 2478804 A1 in the state of the art, for example, discloses a milk reservoir pressurized by gas, the pressurized milk being directed to a mixing area for being further mixed with another gas. Later frothing and reduction of the size of bubbles occurs in a frothing arrangement, comprising typically a static mixer or a rotating whisk. However, the regulation and control of the foaming in such systems is complicated and not precise, also requiring a complex configuration. Moreover, these systems require cleaning after foaming has been produced, which is both cumbersome and time consuming.

Other documents known in the state of the art, such as US 2013/0043274 A1, describe packaging solutions providing storing, dosing and dispensing functions particularly adapted for food fluid products, typically beverages, comprising a container, dosing means and a valve. The dosing means comprise a rotor with at least a truncated part driven in rotation and working as a dosing device, taking liquid from a dosing inlet and driving it to a dosing outlet, such that the liquid from the container is conveyed into a mixing chamber where it is mixed with a diluent: when this diluent is gas ($N_2$ or $CO_2$) a head of foam is provided on the upper layer of the beverage. However, the foaming process in this system is not produced in a controlled and precise way, being very difficult to monitor and to regulate it and, consequently, to obtain repeatable results from one fluid foamed to another.

Accordingly, other solutions have been provided to allow the production of foaming fluids in a controlled and regulated manner. An example is provided in EP 12199185.5 belonging to the same applicant, where a device for producing milk foam is disclosed: high shear stress is applied to a milk-air mixture in the gap between two cylinders rotating with respect to each other, the shear stress leading to an emulsion of the milk and the air, with a later foaming effect once expansion occurs. With this solution, milk foam can be produced in a controlled way. However, the device is relatively complex and requires frequent cleaning after milk foam has been produced, something which is time consuming and not attractive for the user.

There are also well known foaming devices in the state of the art which use steam to foam via a Venturi effect, such as for example the devices shown in EP 2695556 A1 or in EP 2636343 A1. Document EP 2695556 A1 discloses a device for preparing heated milk foam having a suction device comprising a mixing chamber with vapour and milk, such that this mixture is suctioned through utilizing Venturi effect, so that milk foam is provided. Another example is provided in document EP 2636343 A1, where a device for producing heated milk foam is described: this device uses a narrowing nozzle, particularly a Venturi nozzle, for obtaining a suction effect of milk and vapour, in order to produce milk foam. However, these known systems using the Venturi effect are not operated in a clean way, the milk being repeatedly in contact with the device which not only imposes often cleaning but which can also be a source of product contamination. Moreover, these devices only allow the production of hot milk foam: cold milk foam is not an option when using such systems. Apart from this, the quality of the foam obtained by using these systems is not satisfying.

Thus, today there is no convenient and effective solution providing superior quality foam for devices used at home. Existing solutions to dispense superior quality foam typically use gear pump technologies making the devices both expensive and difficult to clean. For this reason, machines providing high quality micro foams are only found at present in business applications, where the machine can be connected to the water network and so allowing automatic cleaning.

Therefore, there exists the need to provide a solution capable of delivering high quality foams in a simple, easy and inexpensive manner, adapted for home solutions and which are also easy to clean afterwards. The present invention aims at providing a solution addressing these and other needs.

SUMMARY OF THE INVENTION

According to a first aspect, the invention relates to an inline fluid foaming device for providing a foamed fluid directly into a container: the device comprises an air path for introducing a certain quantity of air into the device, and a fluid path for introducing fluid into the device coming from a fluid container: the mixture of air and fluid passes to a centrifugal pumping and foaming element such that the amount of fluid into the device is pumped by the centrifugal movement of the pumping and foaming element and the foaming of the mixture is provided by driving it under a certain level of shear stress in the element. The device further comprises a heating unit to where the foamed mixture of fluid and air is conveyed for its optional later heating.

Preferably, the air path is controlled by an air valve for introducing a certain controlled quantity of air into the device.

According to the inline fluid foaming device of the invention, the pumping and foaming element is preferably configured with at least two parts rotatable relative to each other. These at least two parts typically form a gap between them so that the level of foaming of the mixture depends on the dimensions of the gap and on the relative rotational speed of the parts.

Preferably, in the fluid foaming device of the invention, the amount of fluid pumped into the device depends on the relative rotational speed of the parts.

Typically, according to the invention, the pumping and foaming element is configured as a disc. According to a possible embodiment of the invention, the disc comprises a patterned or embossed surface and a flat or smooth surface or two patterned or embossed surfaces or two flat or smooth surfaces.

Preferably, the inline fluid foaming device according to the invention further comprises an outlet in direct communication with the exit of a heating path in the heating unit. Typically, the heating unit is configured as a heating plate, facing a heating path where the mixture flows.

In one of the embodiments of the present invention, the air valve is magnetically operated. In another possible embodiment of the invention, the pumping and foaming element is magnetically driven.

Typically, the inline fluid foaming device according to the invention is configured connectable to a beverage dispensing machine in order to manage foamed fluid deliveries or different beverage recipes, through a commanded HMI in the device.

Preferably, according to the invention, the HMI controls the operation of the said device according to one or a plurality of operating parameters: rotational speed of the pumping and foaming element, duration in time of the rotation of the pumping and foaming element, temperature of the fluid, ratio of air with respect to the quantity of fluid, type of beverage dispensed from the beverage dispensing machine.

According to a possible embodiment of the inline fluid foaming device of the invention a sequence of operation of the device is set by one or a plurality of operating parameters, such that a certain beverage recipe is made of one or a plurality of these sequences. Typically, the foamed fluid deliveries commanded through the HMI can be: liquid delivery, light foamed fluid, dense foamed fluid and/or foamed fluid with a certain ratio (%) of foam.

In a preferred embodiment of the device of the invention, it is connectable to a coffee machine. Typically, the recipes commanded through the HMI can be: latte, cappuccino or latte macchiato, amongst others.

According to a second aspect, the invention relates to a beverage system comprising an inline fluid foaming device as the one described earlier, and a beverage dispensing machine. Typically, according to the invention, the beverage dispensing machine is a coffee machine.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which:

FIG. 11a shows the parameters configuring an exemplary sequence for a recipe to be prepared with an inline fluid foaming device according to the invention.

FIG. 11b shows three exemplary sequences for a recipe to be prepared with an inline fluid foaming device according to the invention.

FIG. 12 shows three possible recipes to be prepared as standalone recipes (only milk) to be prepared with an inline fluid foaming device according to the invention, in particular, liquid, light foam and dense foam.

FIG. 13 shows three possible recipes to be prepared as coffee recipes to be prepared with an inline fluid foaming device according to the invention connected to a coffee machine, in particular, latte, cappuccino and latte macchiato.

DETAILED DESCRIPTION OF EXEMPLARY EMBODIMENTS

Figure 1:
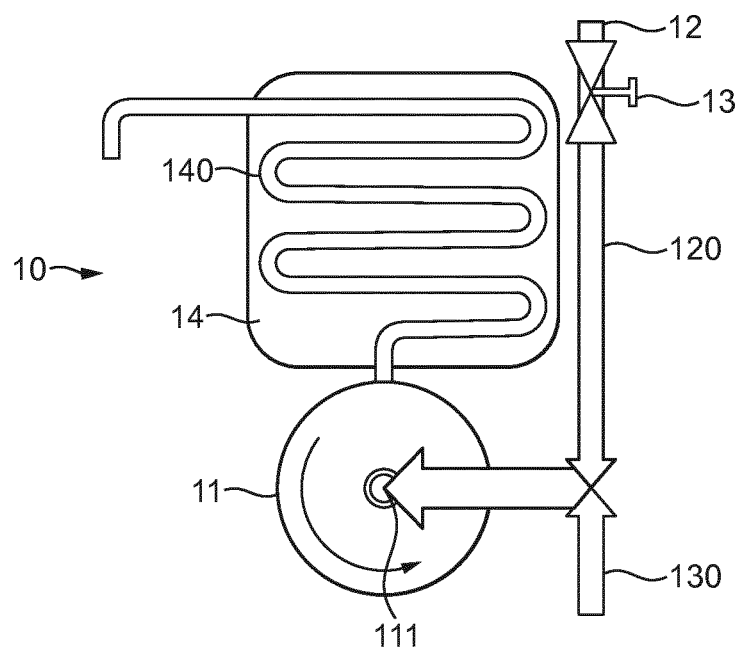
FIG. 1 shows a schematic representation of the operating principle of an inline fluid foaming device according to the present invention.

The present invention is directed to an inline fluid foaming device 10 providing fluid foam directly into cup. Typically, the fluid used with the device of the invention is milk. The fluid foaming device 10 comprises a pumping and foaming element 11 and an air entry 12, the air entry 12 being controlled by an air valve 13. Typically, according to the invention, the pumping and foaming element 11 is configured comprising a rotating element; the rotation of this element provides a centrifugal effect delivering the following: the pumping of the fluid and the air, and the further foaming of this mixture by passing it through a small gap where it is subjected to high shear stress forces, making this mixture to foam by Couette Flow effect. The quantity of air pumped and mixed with the fluid is controlled by the rotational speed of the element, by the opening of the air valve 13 and/or by the geometry of the air path following the air entry 12. The fluid foaming device 10 of the invention further comprises a heating unit 14: the mixture of fluid and air, when passing through this unit 14, can optionally be heated in order to provide a hot foamed fluid. When the heating unit 14 is not activated, the foamed fluid flowing through it will be delivered cold or ambient (not hot). A schematic view of the elements configuring the fluid foaming device 10 and the way they work is shown in FIG. 1.

Different embodiments are possible according to the invention: the air entry 12 can go directly into the air path 120 without any air valve 13: therefore, the air inlet towards the device 10 will always be open and the control of the foaming will be done by acting on the rotation speed of the pumping and foaming element 11 and also on the geometry of the air path 120. Another possibility is to have an air valve 13 after the air entry 12 and before the air path 120 into the device 10, as described in the paragraph above. In this case, the air valve 13 can be controlled either manually or either automatically (when automatically controlled, there are two options: that the valve is magnetically driven or that it is directly driven).

Figure 2A:
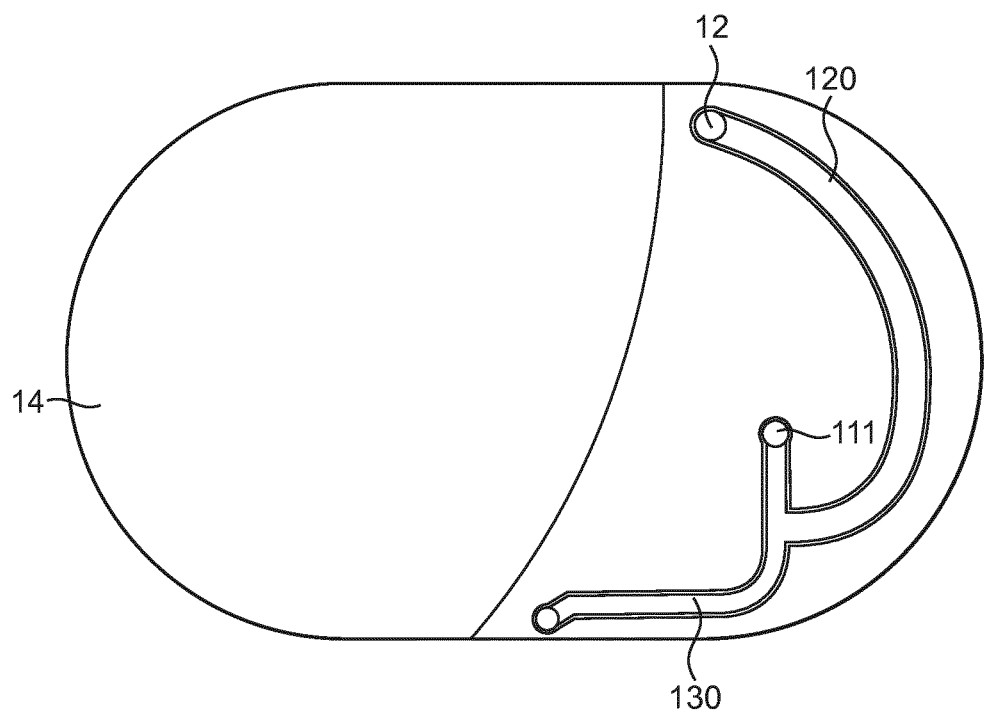
FIG. 2a shows the air and milk paths in an inline fluid foaming device according to a first embodiment of the present invention.
Figure 2B:
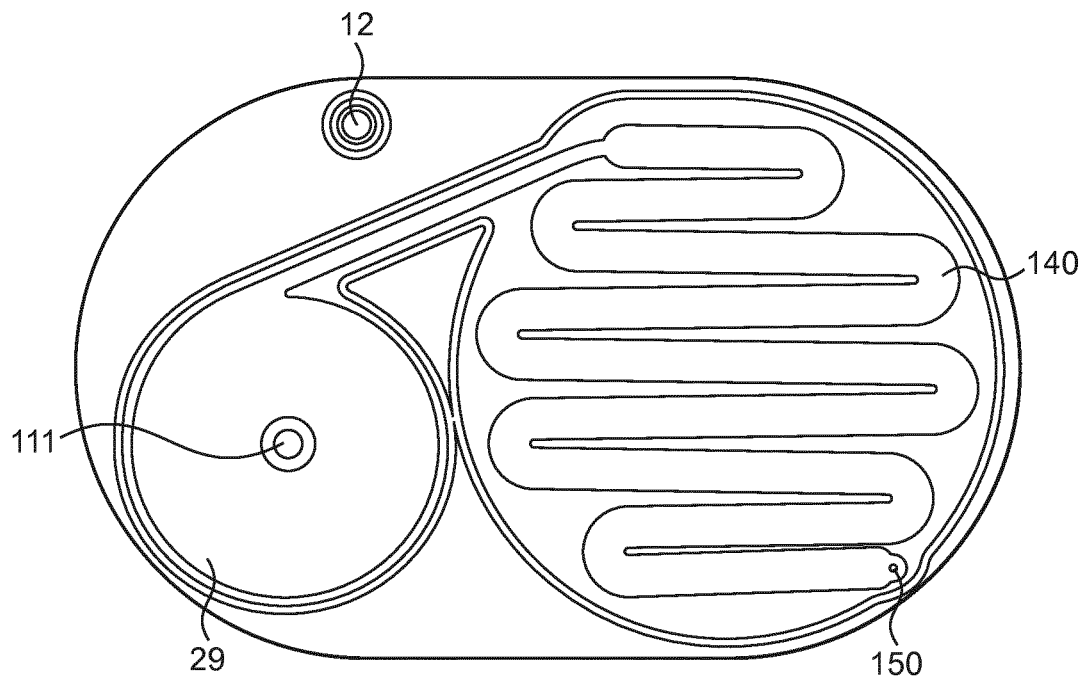
FIG. 2b shows the pumping and foaming chamber and the heating path in an inline fluid foaming device according to a first embodiment of the present invention.

FIGS. 2a and 2b show a first embodiment of the inline fluid foaming device 10 of the invention. In particular, FIG. 2a shows an air path 120 and a fluid or milk path 130, both going into the inlet 111 towards the pumping and foaming element 11. The rotation of the pumping and foaming element 11 pumps by suction the fluid (typically milk) from a fluid container 16 and also pumps air through the air entry 12 (in fact, the air is controlled by an air valve 13). Both air and fluid are driven by centrifugal forces into the inlet 111 towards the pumping and foaming element 11, having been first mixed. Looking at FIG. 2b, the mixture of fluid and air is then conveyed into a heating unit 14, passing through a heating path 140, typically configured with a labyrinth shape, being optionally heated. The foamed fluid exits through 150 towards the device outlet 15, directly into cup.

Figure 3A:
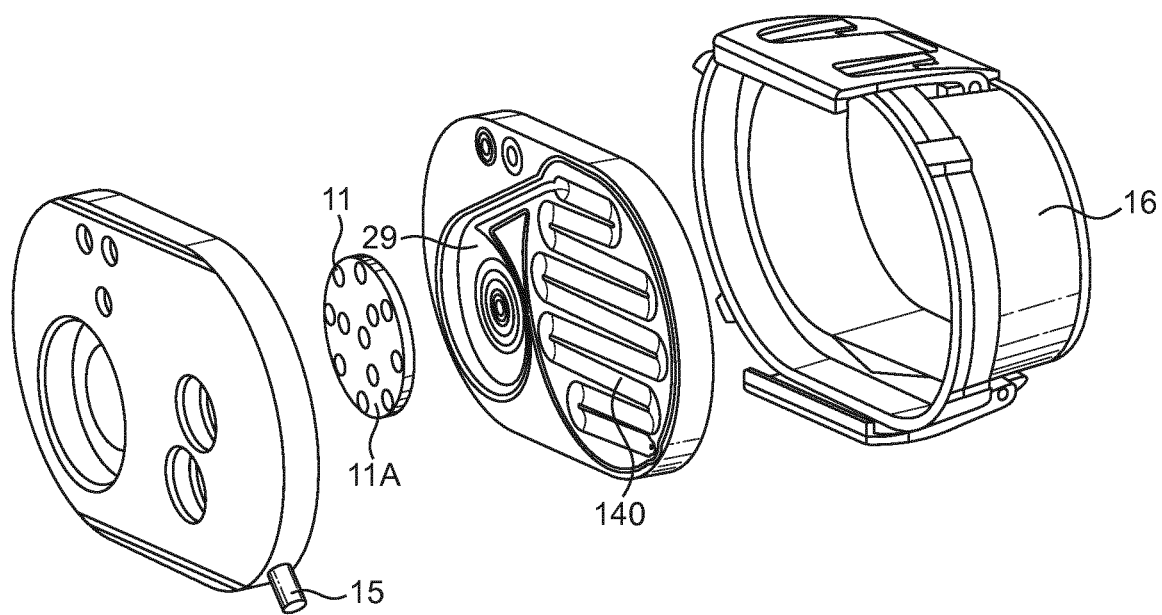
FIGS. 3a-b show a planar configuration of an inline fluid foaming device according to a first embodiment of the invention, together with a fluid container.
Figure 3B:
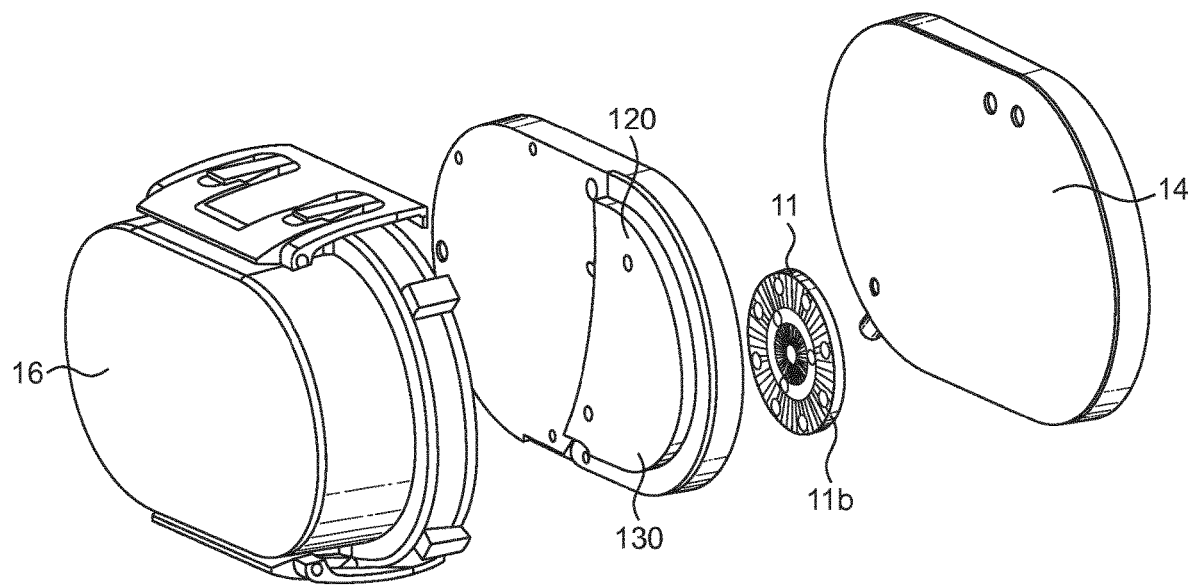

FIGS. 3a and 3b show in further detail the configuration of the first embodiment of the inline fluid foaming device 10 of the invention, as represented in FIGS. 2a and 2b. The pumping and foaming element 11 is configured as a single disc, with different designs of the faces, typically with a substantially flat and smooth surface 11a (FIG. 3a) used for obtaining the foaming of the fluid and a patterned surface with a certain embossment 11b (FIG. 3b) used for pumping the fluid from a fluid container 16 and mixing it with air. Looking at FIG. 3b, the rotation of the disc 11 (patterned or embossed surface 11b) pumps fluid (typically milk) from the container 16 (milk path 130) and mixes it with air coming from the air entry 12 and controlled by the air valve 13 (air path 120). Once the mixture of fluid and air is done, it passes to the other side of the disc (flat or smooth face 11a), as represented in FIG. 3a, where it will be foamed again by the rotation of the disc 11 with respect to a stationary surface (the mixture is conveyed into a gap between the disc 11 and the surface and, when the disc 11 rotates, the mixture is foamed by Couette Flow effect (high shear stresses on the mixture). Once foamed, the mixture goes into the heating path 140 where it can be heated or not, before being delivered through the device outlet 15. A possible configuration of the heating unit 14 is a heating plate, as represented in FIG. 3b. Preferably, the pumping and foaming element 11 is rotated by a magnetic drive, highly simplifying the number of elements needed and the further cleaning of intermediate mechanical driving means and/or elements. Even when it has been described that the disc comprises two parts, an embossed or patterned one and a smooth one, preferably contributing to pumping and foaming, respectively, this is just one embodiment possible: the disc 11 can also comprise two smooth parts or two embossed or patterned parts, for example, and will still perform the same functions.

As shown in FIGS. 2a-b and 3a-b, the configuration of the inline fluid foaming device 10 is made very compact and relatively flat, which allows a compact and easy integration into the final device.

Figure 4A:
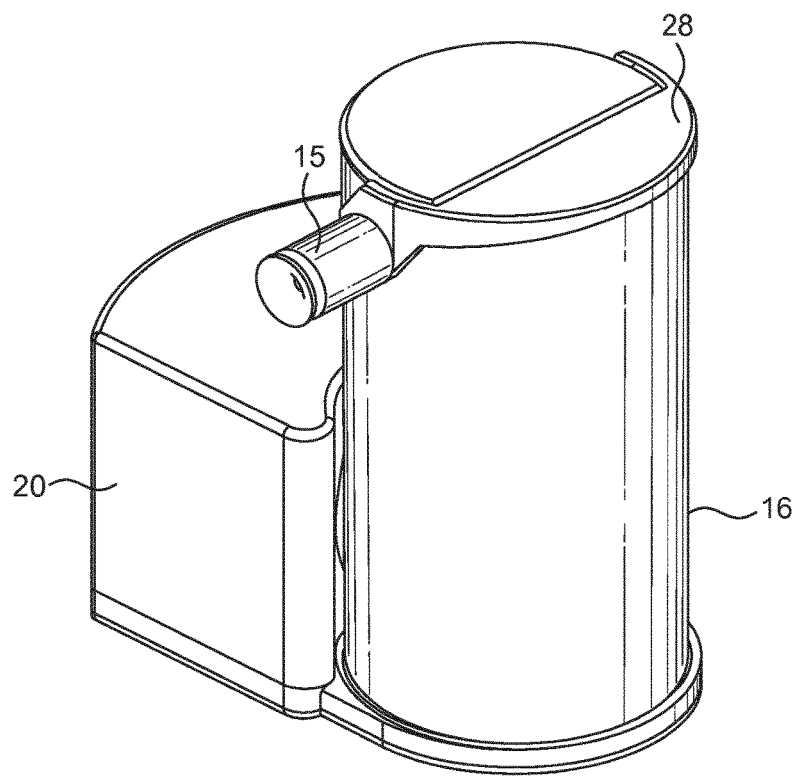
FIGS. 4a-b show an inline fluid foaming device according to a second embodiment of the invention, integrated inside a fluid container and connected to a base.
Figure 4B:
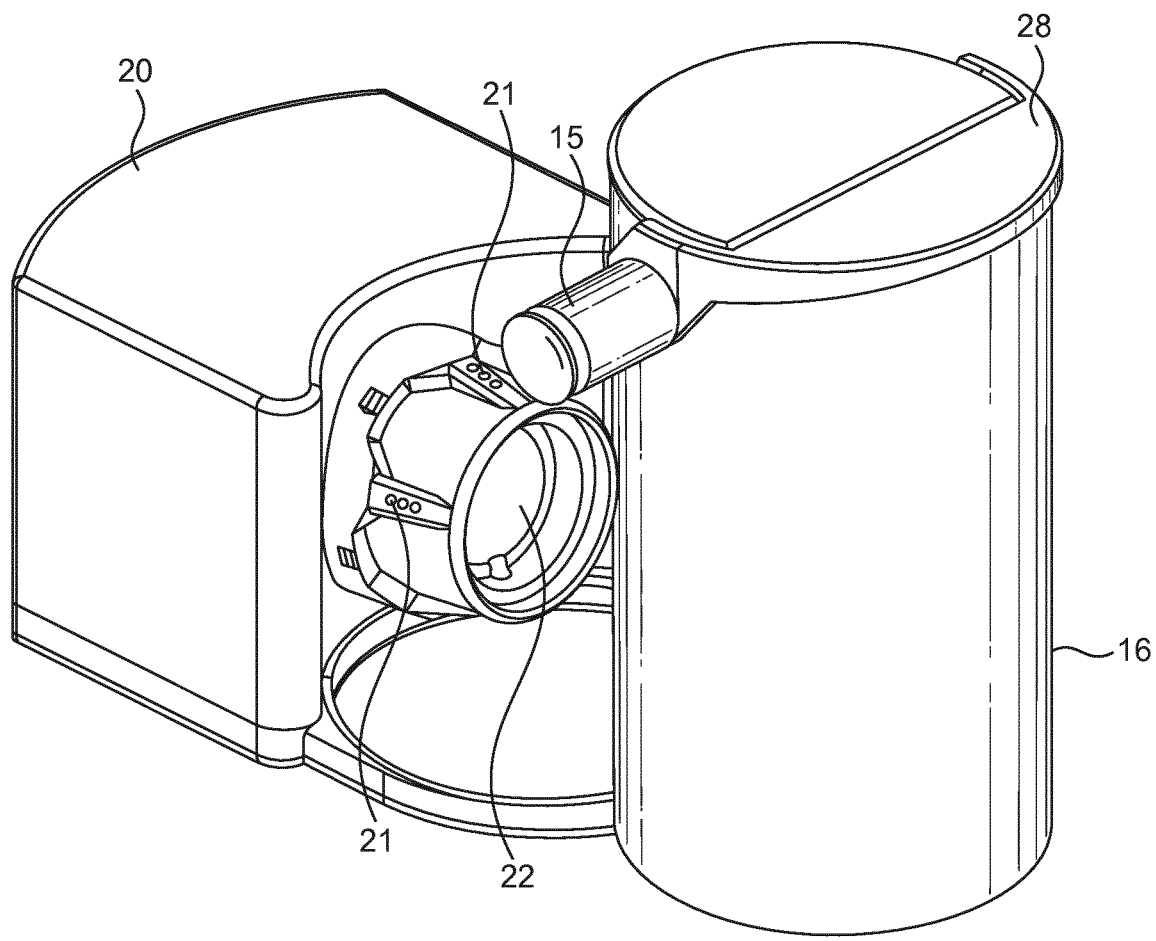

Looking at FIGS. 4a and 4b, a second possible embodiment of the inline fluid foaming device 10 is represented, integrated inside a vertical, cylindrically shaped container. The device 10 is integrated inside a fluid container 16 with an upper device outlet 15 to cup. The pumping and foaming element (inside the fluid container 16 of FIGS. 4a-b) is rotated by a magnetic drive 22 (FIG. 4b) connected to a base 20 with electric connections 21.

Figure 5A:
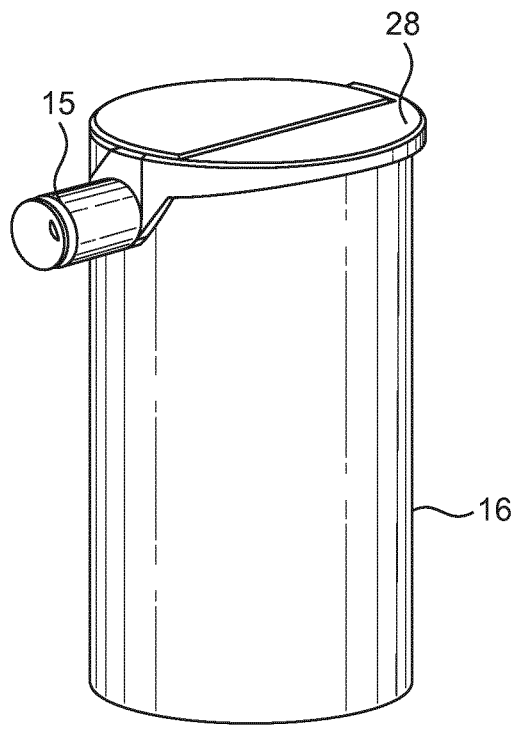
FIGS. 5a-d show in more detail the configuration of the inline fluid foaming device according to a second embodiment of the invention, integrated inside a fluid container, as represented in FIGS. 4a-b.
Figure 5B:
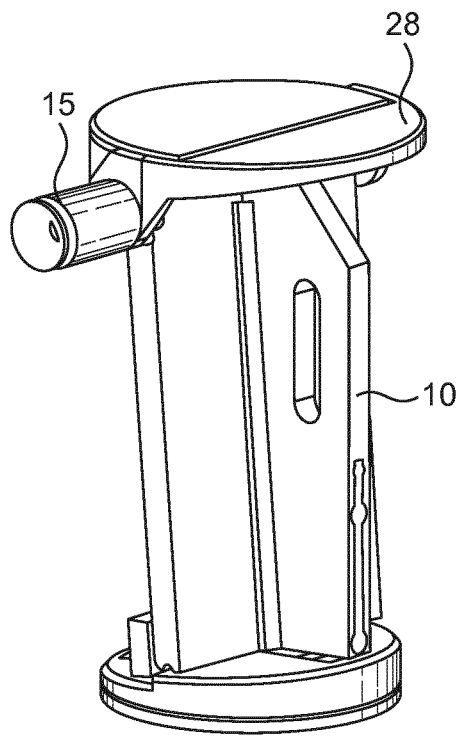
Figure 5C:
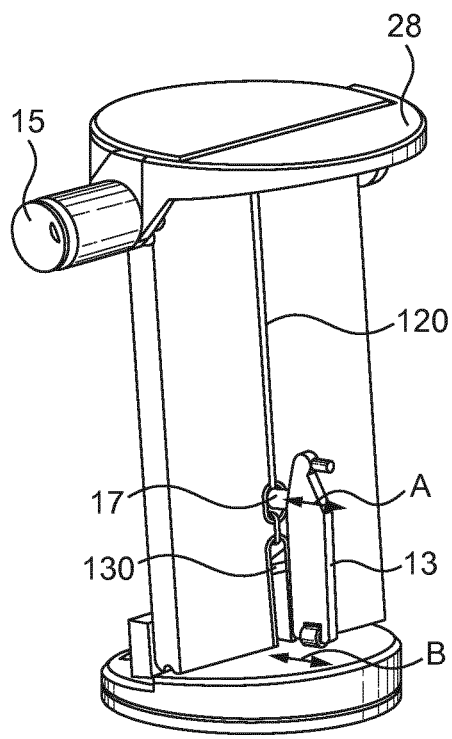
Figure 5D:
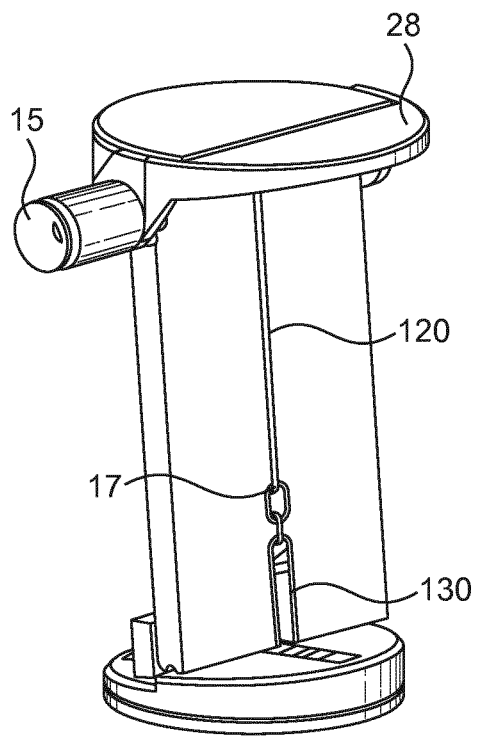

A more detailed view of the configuration of the inline fluid foaming device 10 of the invention is shown in FIGS. 5a to 5d. The fluid container 16 accommodates inside the inline fluid foaming device 10: the air path 120 and the milk (fluid) path 130 are shown in FIGS. 5c and 5d, the air and the milk being respectively pumped and directed towards the pumping and foaming element 11 (shown in FIGS. 6a-c) for mixing and foaming. An upper outlet 15 is provided, from where the foamed fluid is directed into a cup. Further, a handle 28 is typically provided on the upper part of the inline fluid foaming device 10 to remove the device 10 from the container 16 in order to clean it. An air valve 13 is represented in FIG. 5c: typically, this valve is magnetically actuated and is therefore magnetically driven as it is represented by arrows A and B in FIG. 5c. The air valve 13 sits on an upper seat 17 and thus controls accurately the amount of air into the air path 120 to be mixed with the fluid, by its magnetic driving provided as shown by arrow B in FIG. 5c.

Figure 6A:
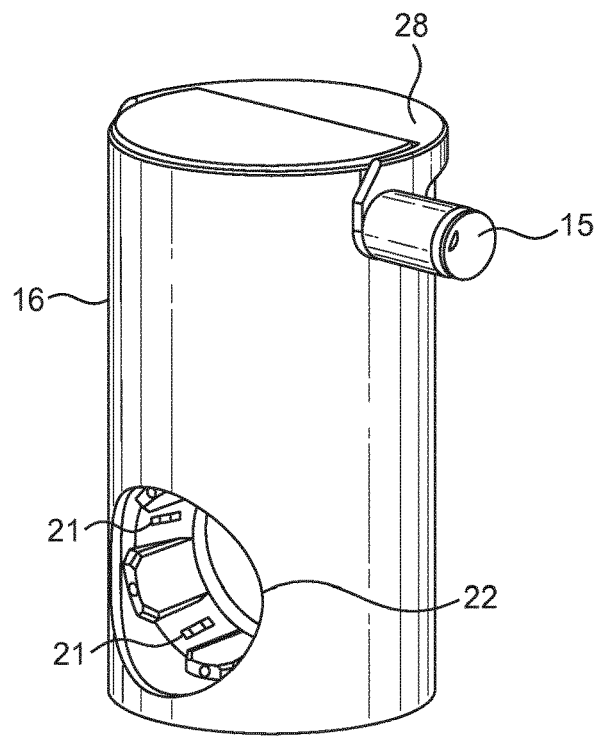
FIGS. 6a-c show details of the pumping and foaming disc and the heating path in an inline fluid foaming device according to a second embodiment of the invention.
Figure 6B:
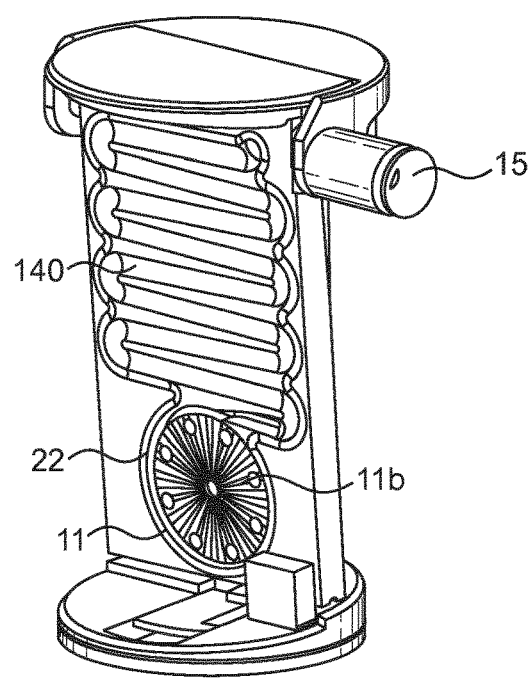
Figure 6C:
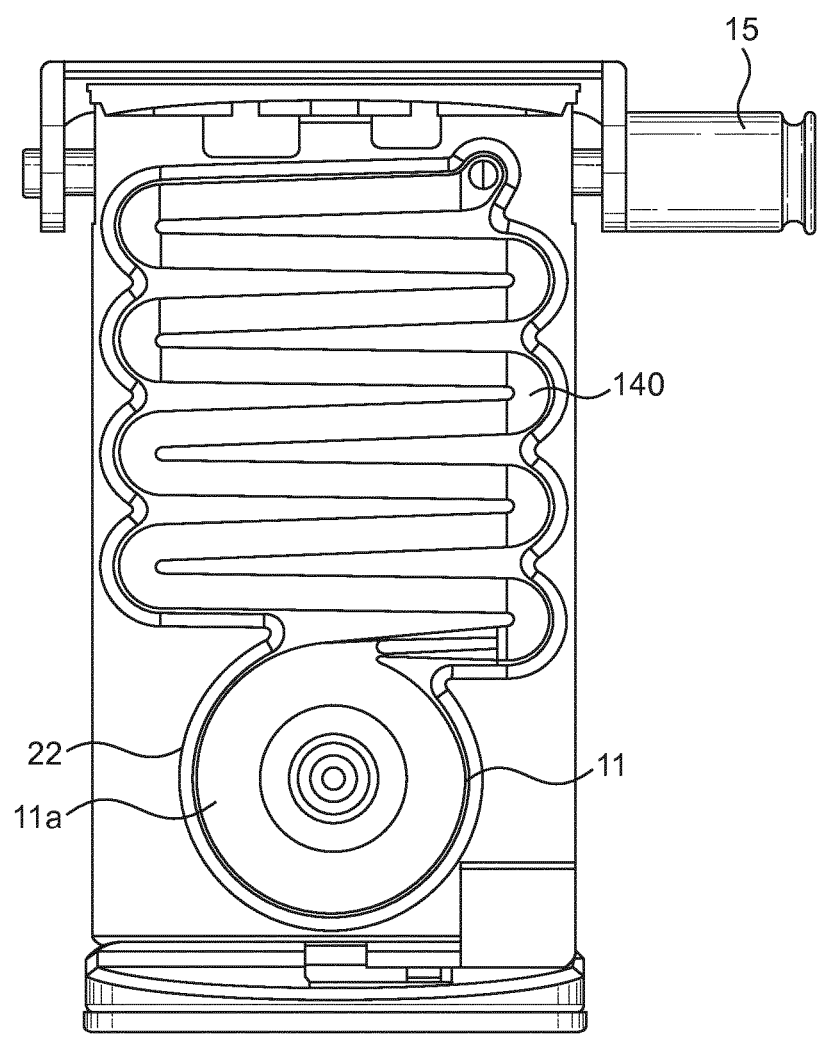

The rest of the details of the fluid foaming device 10 are shown in FIGS. 6a-b-c: the pumping and foaming element 11 is typically configured as a disc, with a patterned or embossed surface 11b for the pumping and mixing of the fluid with air, and a flat or smooth surface 11a for foaming the said mixture. The heating path 140 through where the foamed mixture flows after leaving the pumping and foaming element 11 to be optionally heated is represented in FIGS. 6b and 6c. The final fluid is delivered through the device outlet 15. This second configuration of the inline fluid foaming device 10 in vertical is also compact and easy to insert into and extract from the fluid container 16, particularly for a convenient cleaning.

Figure 7A:
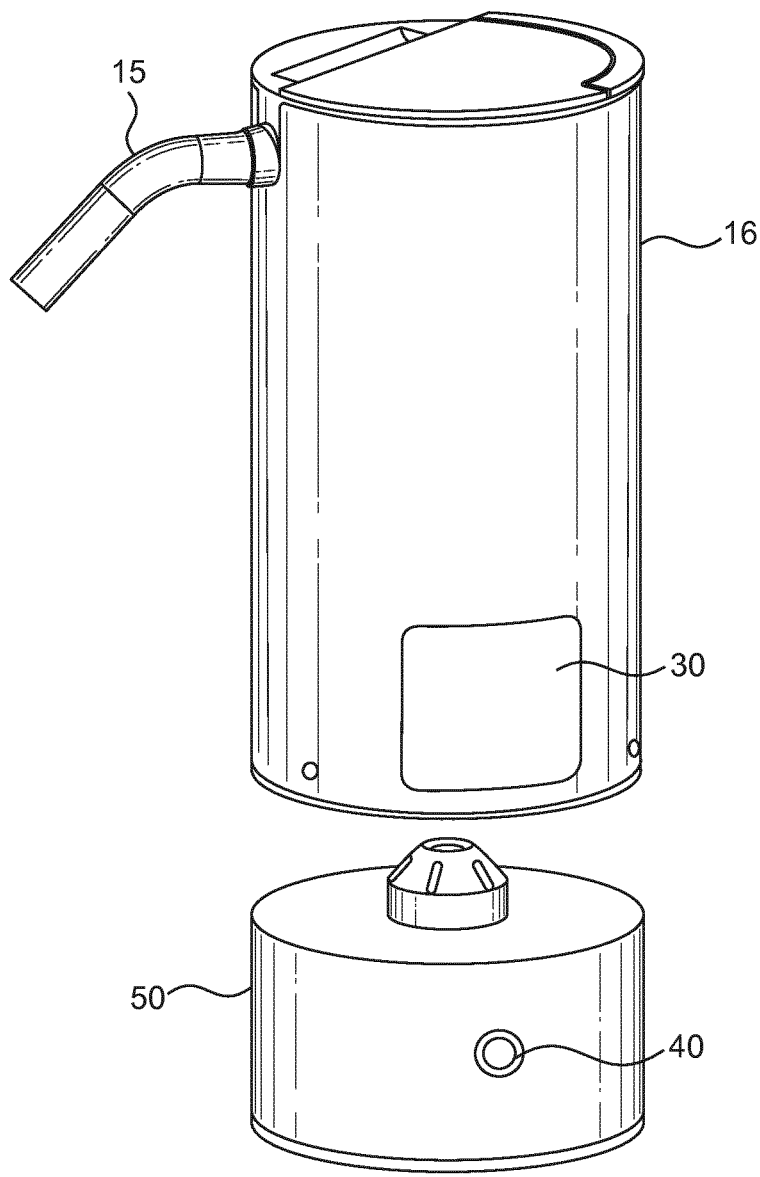
FIGS. 7a-c show different views in detail of an inline fluid foaming device according to a third embodiment of the invention.
Figure 7B:
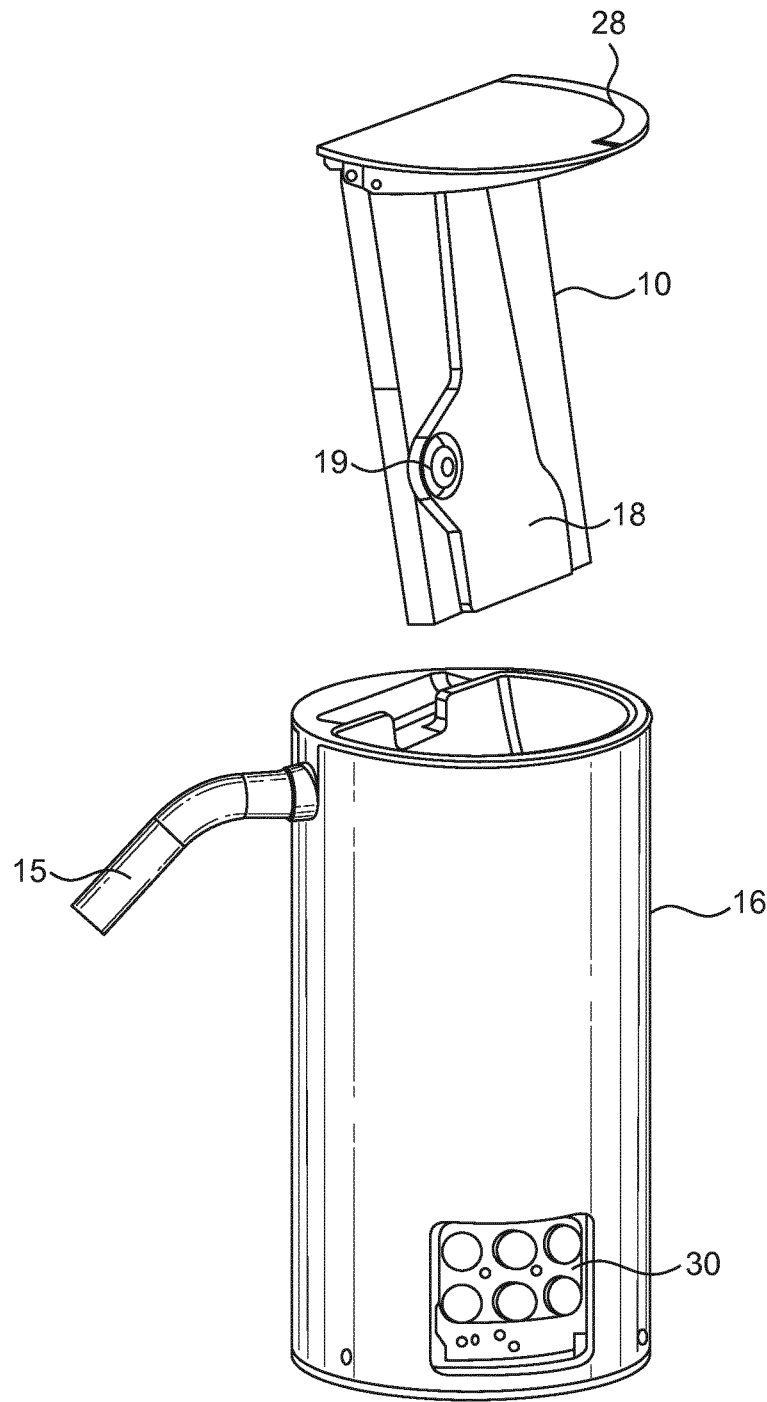
Figure 8:
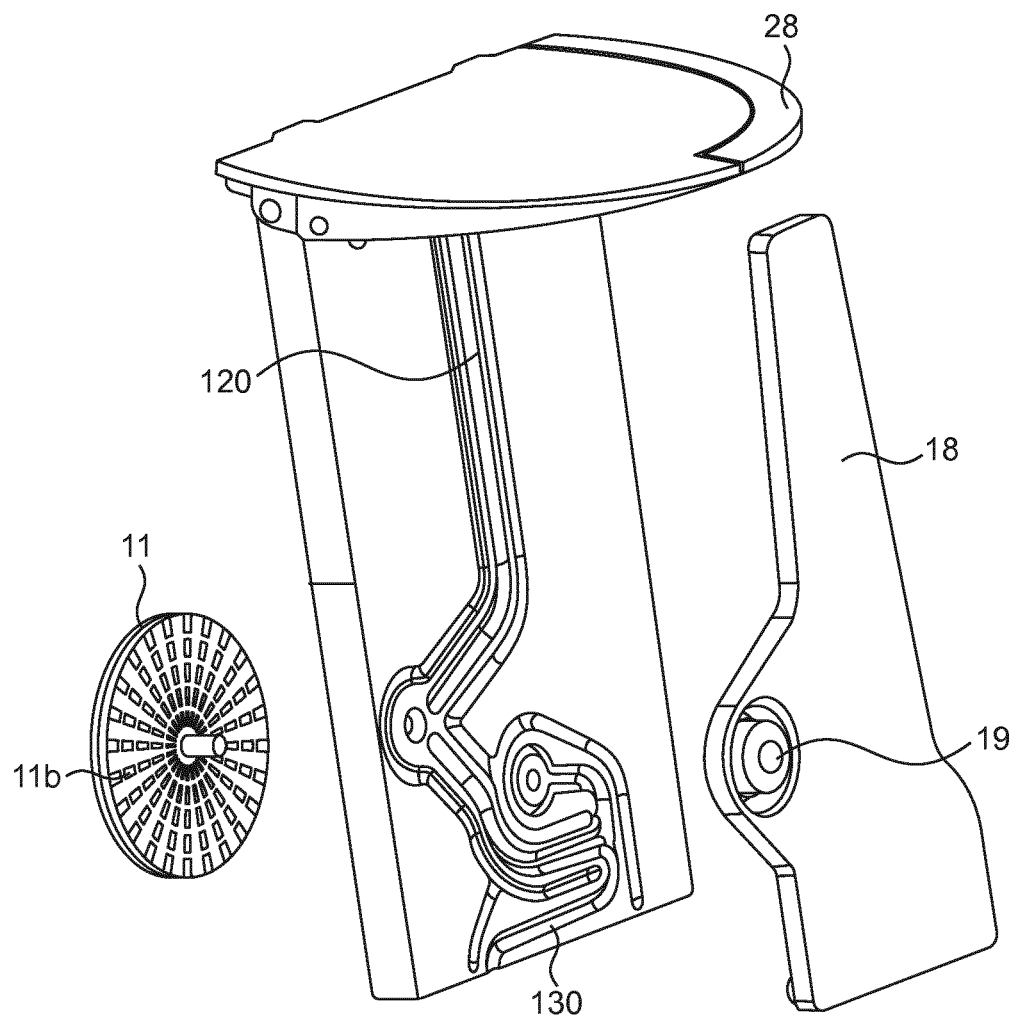
FIG. 8 shows the configuration of the air and milk paths and the air valve actuator in an inline fluid foaming device according to a third embodiment of the invention.
Figure 9A:
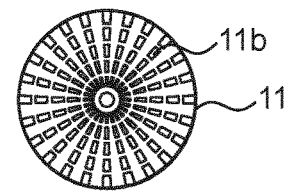
FIGS. 9a-b-c show a pumping and foaming disc, the configuration of the air and milk paths and the air valve actuator and tightness cover, respectively, in an inline fluid foaming device according to a third embodiment of the invention.
Figure 9B:
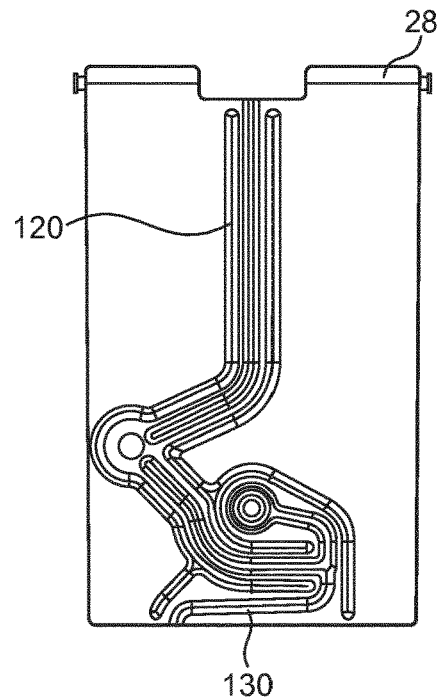
Figure 10A:
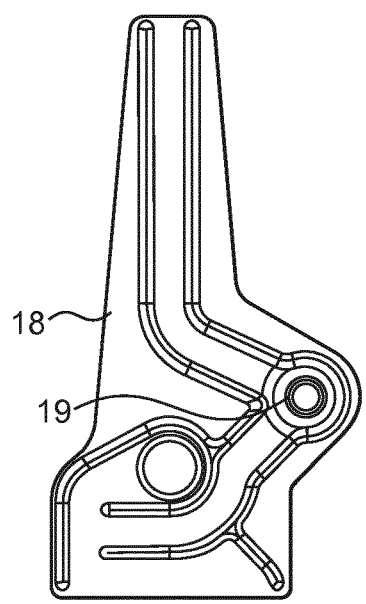
FIGS. 10a-b-c show the rear sides of the air valve actuator and tightness cover, the pumping and foaming chamber and the heating path, and a pumping and foaming disc, in an inline fluid foaming device according to a third embodiment of the invention, shown in figures a-b-c.
Figure 10B:
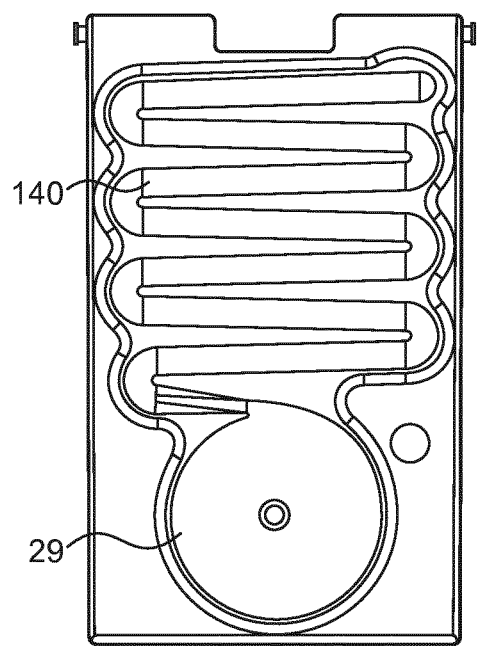
Figure 10C:
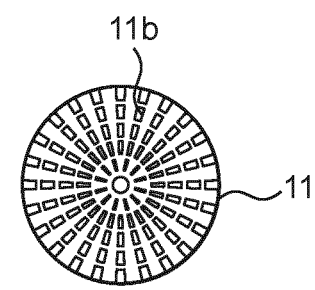

Yet a third possible embodiment of the inline fluid foaming device 10 of the invention is shown in FIGS. 7*a-b-c* and further detail of its internal configuration follows in FIG. 8, FIGS. 9*a-b-c* and FIGS. 10*a-b-c*. FIG. 7*a* shows the fluid container 16, with an upper outlet 15 and accommodating inside the fluid foaming device 10. Furthermore, a HMI 30 is allocated in the lower part of the fluid container 16, so that the consumer can choose different recipes and/or types of foaming etc. as it will be further explained in more detail. The fluid container 16 with the foaming device 10 is connected to a docking base 50, switched on or off by an operating button 40. Contrarily to the second embodiment, the magnetic drive for operating the magnetic disc drive (operating in rotation the pumping and foaming element 11) and the magnetic air actuator (operating an air valve actuator 19) are embedded in the container 16, and the docking base 50 is only responsible for transmitting power and information (typically, also to the HMI 30). The air actuator or the disc drive (pumping and foaming element) can also be operated by a motor, in which case it will be similarly embedded in the container 16.

Figure 7C:
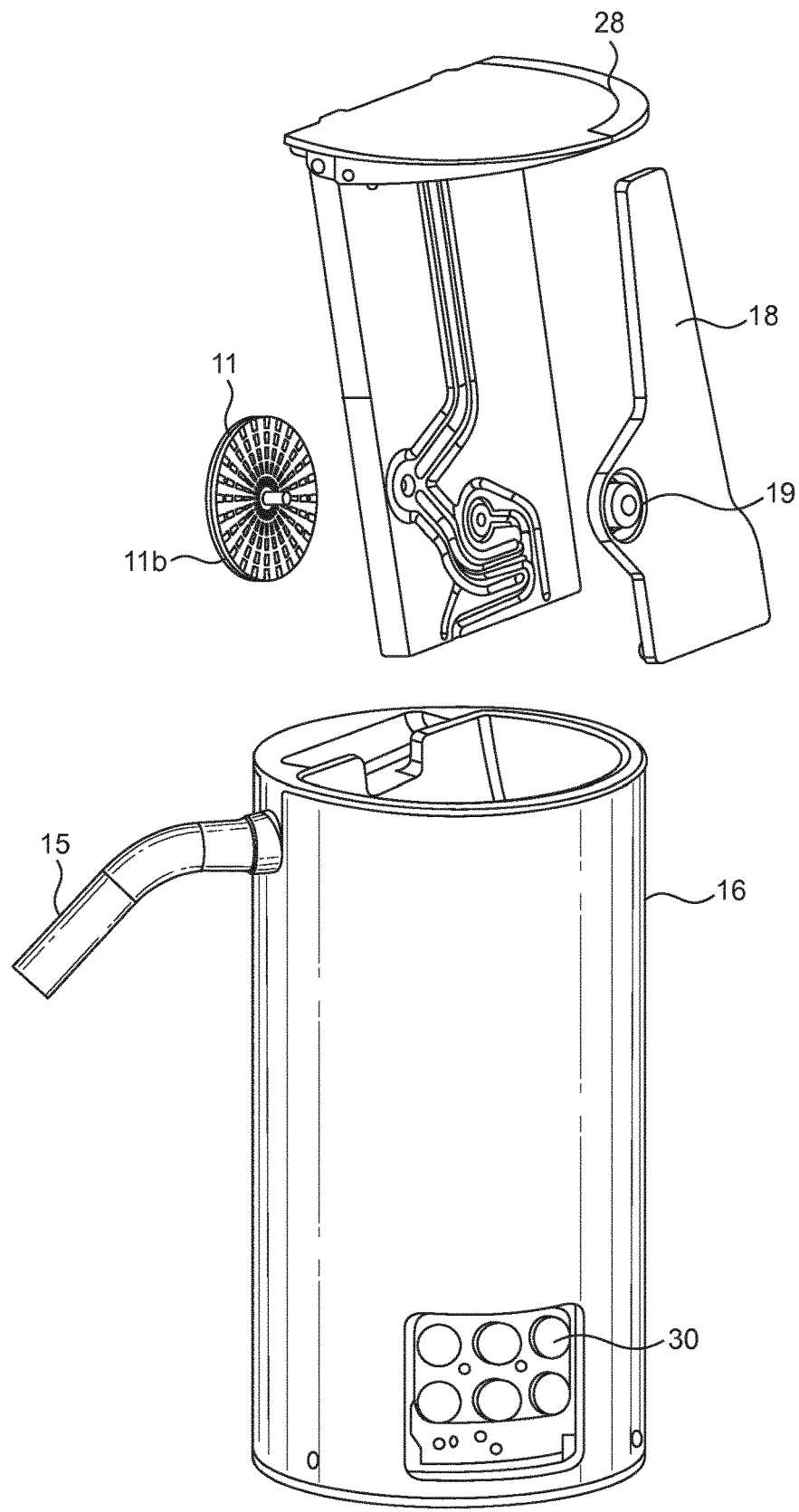

The air path 120 and milk path 130 are closed tightly by means of a tightness cover 18, as represented in FIGS. 7*b* and 7*c*. The air is controlled into the air path 120 by means of an air valve actuator 19, sealing in a higher or lower degree the air income into the air path 120. Preferably, this air valve actuator 19 is also magnetically driven by a magnetic air actuator (not shown, typically inside the fluid tank 16).

Figure 9C:
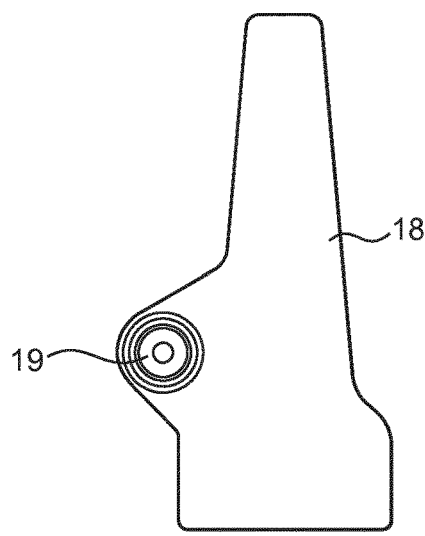

Looking at FIG. 8, the configuration of the inline fluid foaming device 10 is shown in more detail, also showing a handle 28 to remove and/or place the said device 10 in the container 16. FIG. 9*a* shows a possible configuration of the patterned or embossed surface 11*b* of the pumping and foaming element 11: different patterns and configurations are possible, depending on the various textures to provide to the mixture of fluid and air. FIG. 9*c* shows in detail the tightness cover 18 and the air valve actuator 19. The mixture of fluid and air is driven into high shear stress (Couette Flow) into a pumping and foaming chamber 29 as shown in FIG. 10*b*. The heating path 140 typically faces a heating plate (not shown) so that, when the mixture flows through this path 140, it can be, if desired, heated.

The inline fluid foaming device 10 of the invention, typically fully integrated with the fluid container 16 is preferably made connectable to a beverage dispensing machine, typically a coffee machine or the like. Such a system will therefore be able to provide different beverages and different recipes. For example, when looking at FIG. 12, standalone recipes will be available, chosen from the HMI 30 menu: for these recipes, the device 10 will work on its own, i.e. no beverage (for example, coffee) will be delivered by the beverage dispensing machine associated, and only fluid will be delivered by the device 10. Different possibilities will still be offered, for example providing only fluid (such as milk), hot or not, or a light foamed fluid or a dense foamed fluid, depending on the consumer wishes. These are only some possibilities presented, though many others will also be able to be configured with the device of the invention. Some coffee recipes are also possible when the device 10 works together with a beverage dispensing machine, of the coffee type. Three exemplary options are represented for example in FIG. 13, such as Latte, Cappuccino or Latte Macchiato: the instructions sent to the coffee machine for the type of coffee to provide after foamed milk (for Latte and Cappuccino recipes) and after foamed milk and milk (for Latte Macchiato recipe) are marked with an asterisk (*).

Typically, a recipe is composed of one or several sequences for the types of foam, milk or coffee, each of these sequences including at least one or a combination of the following parameters:

Motor speed
Motor time
Temperature
Air valve duty cycle
Coffee type

This has been exemplified in FIG. 11*a*: FIG. 11*b* shows a recipe made with a 1, 2 and (n) of these sequences, each sequence being controlled by one or a combination of the above parameters.

As a summary, the technology of the inline fluid foaming device of the invention consists of a controlled air valve, a centrifugal pumping and foaming element and a gentle heating unit. The construction is made very simple and all technical elements are embedded in a single unit (the inline fluid foaming device 10 as defined previously in the several embodiments representing the invention). The different solutions of the device of the invention allow to efficiently deliver superior quality foam with very few parts and yet allowing a very simplified cleaning. Furthermore, a magnetic drive of the centrifugal pumping and foaming element is provided so as to simplify the cleaning and decrease the number of parts. Preferably, this pumping and foaming element is very simply configured as a single disc, having two sides differently patterned, this disc being responsible for both pumping and foaming features. In addition, an air valve accurately controls the quantity of air into the mixture, typically for the preparation of complex recipes including milk and foam. The actuation of this valve is preferably done magnetically, though it can also be electronically actuated.

In summary, some of the main advantages of the device of the invention are the following:

Superior micro foam being delivered
Adjustable foam density, by acting on the air entry through the adjustable air valve
Simple architecture
In-line system, direct to cup
Embodiments allowing a very easy cleaning
Possibility to deliver hot, cold or ambient preparations
Machine module or accessory architectures are possible
Magnetic drive allowing a simplified cleaning and reduced parts wear, and also allowing the electronic control of recipes (one-touch recipes, milk or foam)
Single disc construction for the pumping and foaming element with very few parts to handle and no tubes for an easy cleaning
Control of entire recipes (for example Cappuccino or Latte Macchiato) at the touch of a button Although the present invention has been described with reference to preferred embodiments thereof, many modifications and alterations may be made by a person having ordinary skill in the art without departing from the scope of this invention which is defined by the appended claims.

The invention claimed is:

1. An inline fluid foaming device for providing a foamed fluid directly into a container, the inline fluid foaming device comprising:
an air path for introducing a certain quantity of air into the inline fluid foaming device;

a fluid path for introducing an amount of fluid into the inline fluid foaming device coming from a fluid container;

a mixture of air and fluid passing to a centrifugal pumping and foaming element such that the amount of fluid into the inline fluid foaming device is pumped by centrifugal movement of the centrifugal pumping and foaming element, and foaming of the mixture of air and fluid is provided by driving the mixture of air and fluid under a certain level of shear stress in the centrifugal pumping and foaming element; and a heating unit where the foamed mixture of air and fluid is conveyed, the inline fluid foaming device is configured to be connectable to a beverage dispensing machine to manage foamed fluid deliveries or different beverage recipes, through a commanded human-machine interface (HMI) in the inline fluid foaming device, the HMI controls the operation of the inline fluid foaming device according to an operating parameter selected from the group consisting of rotational speed of the centrifugal pumping and foaming element, duration in time of the rotation of the centrifugal pumping and foaming element, temperature of the fluid, ratio of air with respect to the quantity of fluid, type of beverage dispensed from the beverage dispensing machine, and combinations thereof, and a sequence of operation of the inline fluid foaming device is set by the operating parameter, such that a certain beverage recipe is made of the sequence.

2. The inline fluid foaming device according to claim 1, wherein the air path is controlled by an air valve for introducing the certain quantity of air into the inline fluid foaming device.

3. The inline fluid foaming device according to claim 2, wherein the air valve is magnetically operated.

4. The inline fluid foaming device according to claim 1, wherein the centrifugal pumping and foaming element is configured with at least two parts rotatable relative to each other.

5. The inline fluid foaming device according to claim 4, wherein the at least two parts form a gap between them so that a level of foaming of the mixture depends on the dimensions of the gap and on a relative rotational speed of the at least two parts.

6. The inline fluid foaming device according to claim 4, wherein the amount of fluid pumped into the inline fluid foaming device depends on a relative rotational speed of the at least two parts.

7. The inline fluid foaming device according to claim 1, wherein the centrifugal pumping and foaming element is configured as a disc.

8. The inline fluid foaming device according to claim 7, wherein the disc comprises a surface selected from the group consisting of a patterned or embossed surface, a flat, smooth surface, two patterned or embossed surfaces, and two flat or smooth surfaces.

9. The inline fluid foaming device according to claim 1 comprising an outlet in direct communication with an exit of a heating path in the heating unit.

10. The inline fluid foaming device according to claim 1, wherein the heating unit is configured as a heating plate, facing a heating path where the mixture flows.

11. The inline fluid foaming device according to claim 1, wherein the centrifugal pumping and foaming element is magnetically driven.

12. The inline fluid foaming device according to claim 1, wherein the foamed fluid deliveries commanded through the HMI are selected from the group consisting of liquid delivery, light foamed fluid, dense foamed fluid, foamed fluid with a certain ratio (%) of foam, and combinations thereof.

13. The inline fluid foaming device according to claim 1, wherein the inline fluid foaming device is configured to be connectable to a coffee machine.

14. The inline fluid foaming device according to claim 13, wherein the different beverage recipes commanded through the HMI are selected from the group consisting of latte, cappuccino and latte macchiato.

15. The inline fluid foaming device according to claim 1, wherein the foamed mixture of fluid and air is conveyed to the heating unit for later heating.

* * * * *